US012767207B2

(12) United States Patent
Hänisch et al.

(10) Patent No.: US 12,767,207 B2
(45) Date of Patent: Oct. 20, 2026

(54) STEERING COLUMN ASSEMBLY

(71) Applicant: ZF Active Safety GmbH, Koblenz (DE)

(72) Inventors: Stephan Hänisch, Dortmund (DE); Goriun Grigorians Sohruli, Meerbusch (DE)

(73) Assignee: ZF ACTIVE SAFETY GMBH, Koblenz (DE)

( * ) Notice: Subject to any disclaimer, the term of this patent is extended or adjusted under 35 U.S.C. 154(b) by 0 days.

(21) Appl. No.: 19/307,156

(22) Filed: Aug. 22, 2025

(65) Prior Publication Data

US 2026/0054769 A1 Feb. 26, 2026

(30) Foreign Application Priority Data

Aug. 23, 2024 (DE) ..................... 10 2024 208 057.8

(51) Int. Cl.
*B62D 1/19* (2006.01)
*B62D 1/181* (2006.01)

(52) U.S. Cl.
CPC ............. *B62D 1/192* (2013.01); *B62D 1/181* (2013.01)

(58) Field of Classification Search
CPC .......... B62D 1/181; B62D 1/185; B62D 1/19; B62D 1/192
See application file for complete search history.

(56) References Cited

U.S. PATENT DOCUMENTS

| | | | | |
|---|---|---|---|---|
| 10,994,767 | B2 * | 5/2021 | Büker | B62D 1/184 |
| 11,066,094 | B2 * | 7/2021 | Birkheim | B62D 1/195 |
| 11,260,896 | B2 * | 3/2022 | Haenisch | B62D 1/192 |
| 11,932,303 | B2 * | 3/2024 | Homma | B62D 1/195 |
| 2019/0283793 | A1 * | 9/2019 | Matsuno | B62D 1/195 |
| 2025/0289493 | A1 * | 9/2025 | Raich | B62D 1/192 |

* cited by examiner

*Primary Examiner* — Laura Freedman

(74) *Attorney, Agent, or Firm* — Tarolli, Sundheim, Covell & Tummino LLP

(57) ABSTRACT

A steering column assembly for a vehicle has a bearing element fixed to the vehicle and a sleeve element (14) mounted thereon, through which a steering spindle extends, Furthermore an electric steering column adjustment with an adjustment part (26) is provided, by means of which the sleeve element (14) can be adjusted in the axial direction relative to the bearing element, Furthermore, the steering column assembly has an energy absorption device (16) which is coupled to the bearing element (12) and to the sleeve element (14). The energy absorption device (16) has a holder (32) for a reducing part, by means of which the reducing part is fixedly coupled to the bearing element via the steering column adjustment. The adjustment part (26) is permanently rigidly fastened to the holder (32).

18 Claims, 9 Drawing Sheets

STEERING COLUMN ASSEMBLY

RELATED APPLICATIONS

This application claims priority from DE Patent Application DE 10 2024 208 057.8, filed 23 Aug. 2024, the entirety of which is hereby incorporated herein by reference.

TECHNICAL FIELD

The invention relates to a steering column assembly according to the preamble of claim 1.

BACKGROUND

Steering column assemblies for vehicles with an energy absorption device are known. In the event of a vehicle crash, the energy absorption device dampens the impact of the driver on the steering wheel, in that the steering spindle can be displaced in the axial direction away from the driver into the instrument panel and energy-absorbing components, such as roller strips or tear roller strips, absorb part of the energy of the displacement by plastic deformation.

Furthermore, energy absorption devices are known which have an elongated absorption part and a reducing part with a passage for the absorption part. In this case, as a result of a relative longitudinal movement between the absorption part and the reducing part and a tensile force applied to the absorption part, the absorption part is plastically deformed in cross section through the passage having a smaller cross section.

Steering column assemblies with an energy absorption device are provided in particular for vehicles with an airbag in the steering wheel, which in some countries may be driven without a safety belt. In this case, the energy absorption device must absorb a substantial part of the forces acting on the driver when the driver strikes the steering wheel or the airbag in order to minimize the risk of injury.

SUMMARY

It is an object of the invention to provide a steering column assembly which is of particularly compact design.

The object is achieved by a steering column assembly for a vehicle, having a bearing element fixed to the vehicle and a sleeve element mounted thereon, through which a steering spindle extends, an electric steering column adjustment having an adjustment part, by means of which the sleeve element can be adjusted in the axial direction relative to the bearing element, and an energy absorption device which is coupled to the bearing element and to the sleeve element and which has an elongated absorption part and a reducing part having a passage for the absorption part, through which passage the absorption part extends and which has a smaller cross section than an end section of the absorption part. In this case, the bearing and sleeve elements are coupled so as to be longitudinally displaceable relative to one another in the event of a vehicle crash in such a way that a relative longitudinal movement between the absorption part and the reducing part can take place, wherein the end section is plastically deformed in cross-section through the passage of smaller cross-section as a result of the longitudinal movement and a tensile force applied to the absorption part. The absorption part is fixedly coupled to the sleeve element and the energy absorption device has a holder for the reducing part, by means of which the reducing part is fixedly coupled to the bearing element via the steering column adjustment.

The adjustment part is permanently rigidly fastened to the holder. In the sense of the invention, the adjustment part is permanently rigidly fastened to the holder when the adjustment part is mounted on the holder without play, for example screwed. In particular, the adjustment part is not coupled to the holder via a mechanism which provides tool-free coupling and decoupling of the two components.

According to the invention, it has been recognized that no additional fastening devices are required if the steering column adjustment is connected directly to the sleeve element via the energy absorption device. In this way, the steering column assembly is designed to be particularly compact and can have a low mass and a small number of individual parts.

According to an embodiment, the reducing part is a separate component which is mounted on the holder. This design has the advantage that the energy absorption device is of modular construction and can thus be adapted to different requirements with little effort. Specifically, differently designed reducing parts can be used with the holder in order to provide a corresponding energy absorption curve or a corresponding course of contrasting force and thus damping.

In addition or alternatively, a linear guide can be provided on which the holder is mounted so as to be axially displaceable relative to the sleeve element in the longitudinal direction of the sleeve element. This ensures a defined relative movement of the sleeve element and thus of the steering spindle with steering wheel with respect to the bearing element fixed to the vehicle.

In this case, the linear guide can form an anti-rotation device between the holder and the sleeve element in the circumferential direction of the sleeve element in order to ensure a particularly rigid connection.

According to a further embodiment, the linear guide rests against a guide surface of the holder and/or engages in a guide groove of the holder. In this way, the linear guide is designed to be effective and compact.

In particular, the absorption part does not form part of the linear guide, i.e., the linear guide is provided in addition to the absorption part.

Furthermore, the linear guide can have at least one guide rail and thus provide an effective guide with little effort.

In an embodiment, the linear guide is formed integrally with the sleeve element or a fastening part by means of which the absorption part is fastened to the sleeve element. As a result, a separate guide element known in the prior art can be dispensed with, which saves components and production costs.

Furthermore, it can be provided that the holder has a core of metal and a jacket of plastic surrounding the core at least in sections, or that the holder has a base body of plastic and at least one insert, in particular of metal, which are attached to the base body. In this way, the holder can be designed to be particularly mass-efficient.

In an alternative embodiment, the holder is formed from a steel alloy, an aluminum alloy or a die-cast zinc alloy (Zamak) and can thus be produced particularly cost-effectively.

Furthermore, the energy absorption device can have a predetermined breaking element which, in the event of a vehicle crash, is destroyed at the beginning of the relative longitudinal movement between the absorption part and the reducing part. In this way, an unintentional relative movement can be prevented and a minimum force can be defined, which must be overcome in order to start the relative longitudinal movement and thus the energy absorption.

In a further embodiment, the energy absorption device has a holding part to which the absorption part is fastened. A defined plastic deformation of the absorption part in the event of a vehicle crash is thus ensured.

According to one aspect, the absorption part has an external thread and the holding part has an internal thread, by means of which the absorption part and the holding part are screwed together. In this way, the absorption part and the holding part can be connected to one another in a defined manner with little effort, which reduces the manufacturing effort.

Furthermore, the energy absorption device can be designed as a pre-assembled module unit which can be fastened in one piece to the sleeve element during the production of the steering column assembly in order to keep the assembly effort low.

In one embodiment, the preassembled module unit is fastened to the sleeve element by means of at least one screw and thus particularly effectively.

According to one aspect, at least the end section of the absorption part is exclusively cylindrical in the direction of the longitudinal movement. Consequently, no deflection which requires lateral space is provided for.

In addition or alternatively, the absorption part can have a plurality of sections with different diameters in order to correspondingly change the required deformation force during the retraction of the steering column in the event of a vehicle crash.

Furthermore, a section with a particularly large diameter can be provided in the rear region of the absorption part in order to significantly increase the counterforce again towards the end of the crash process and thus effectively absorb the remaining kinetic energy.

Furthermore, the absorption part can have sections with a conical or truncated cone-shaped course in the axial direction, in order to provide an increasing or decreasing force curve in the event of a vehicle crash.

According to a further aspect, the absorption part extends parallel to the longitudinal extent of the sleeve element and is thus arranged in a particularly space-saving manner.

Furthermore, it can be provided that in an initial state, before a vehicle crash, the absorption part has a cross section from a holding end opposite the end section to at least the passage, which cross section permits movement through the passage without plastic deformation of the absorption part. This means that the absorption part has different cross-sections from the beginning. The holding end with the thin cross-section can be guided through the passage for mounting without deformation occurring. The section with the thin cross-section forms a passive section.

In this case, the passive section can extend in the starting position beyond a narrowest point of the passage in the direction of the end section, so that the deformation of the absorption part and thus the energy absorption by the absorption part only starts after the initial relative movement without deformation.

In one embodiment, the adjustment part comprises a spindle nut, through which a motor-driven drive spindle extends for driving the sleeve element. In this way, the steering column assembly can be designed to be particularly compact.

In a further embodiment, the energy absorption device is arranged on the outside of the sleeve element and thus is particularly space-saving.

BRIEF DESCRIPTION OF THE DRAWINGS

Further advantages and features will be apparent from the following description and the accompanying drawings. These show, in particular.

DESCRIPTION

The detailed description below, in conjunction with the attached drawings, in which the same numerals refer to the same elements, is intended as a description of different embodiments of the disclosed subject matter and is not intended to represent the only embodiments. Each embodiment described in this disclosure serves merely as an example or illustration and should not be interpreted as being preferred or advantageous over other embodiments.

All features disclosed below with respect to the exemplary embodiments and/or the accompanying figures may be combined, alone or in any subcombination, with features of the aspects of the present disclosure, including features of preferred embodiments, provided that the resulting combination of features is useful to a person skilled in the art.

Figure 1:
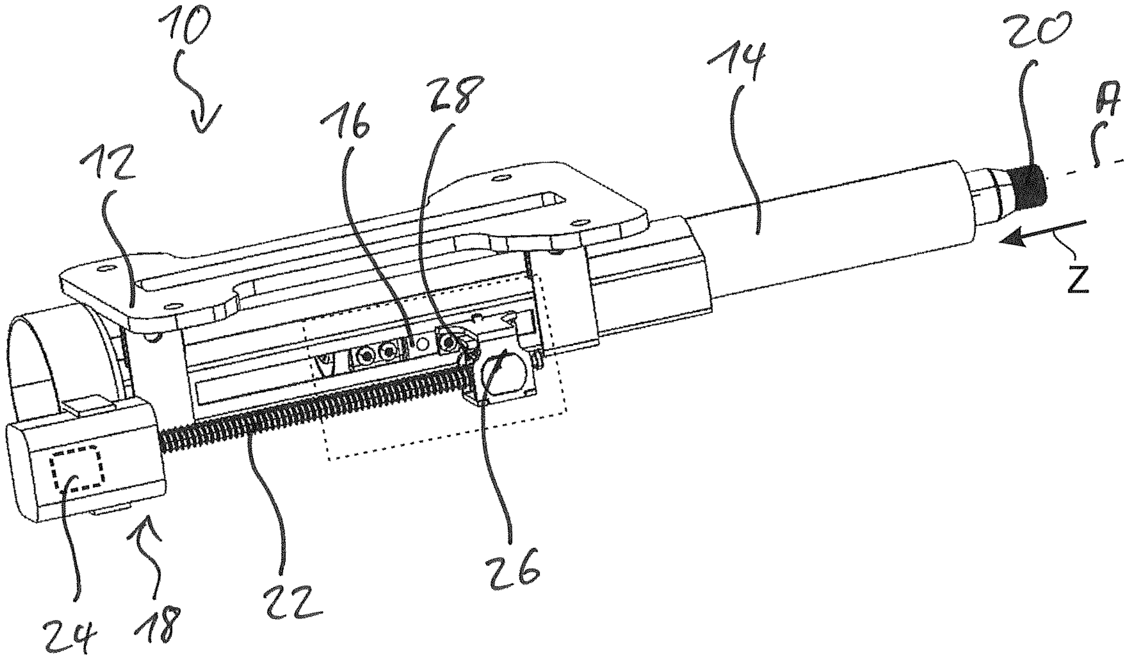
FIG. 1 in a schematic, partially cut-open illustration, a steering column assembly according to the invention for a vehicle, FIG. 2 in a detailed view, a section of the steering column assembly of FIG. 1 with a possible variant of an energy absorption device, FIG. 3 in a perspective view, a sleeve element of the steering column assembly of FIG. 1 with the energy absorption device in an initial position, FIG. 4 in an exploded view, the sleeve element with the energy absorption device of FIG. 3, FIG. 5 in a perspective view, a fastening part of the energy absorption device of FIG. 3, FIG. 6 in a perspective view, a predetermined breaking element of the energy absorption device of FIG. 3, FIG. 7 in a perspective view, a holder of the energy absorption device of FIG. 3, FIG. 8 in a perspective view, a reducing part of the energy absorption device of FIG. 3, FIG. 9 in a perspective view, a holding part of the energy absorption device of FIG. 3, FIG. 10 in a perspective view, an absorption part of the energy absorption device of FIG. 3, FIG. 11 in a perspective view, a core of the holder of FIG. 7, FIG. 12 in a perspective view, a jacket of the holder of FIG. 7, FIG. 13 in a perspective view, the side of the energy absorption device of FIG. 3 facing the sleeve element, the fastening part not being shown, FIG. 14 in an axial sectional view, the energy absorption device of FIG. 3, wherein the section extends through the predetermined breaking element and the fastening part is not shown, FIG. 15 in a rear view, the energy absorption device of FIG. 3, FIG. 16 in a longitudinal section, the energy absorption device of FIG. 3, wherein the fastening part is not shown, FIG. 17 in a perspective view, the sleeve element with the energy absorption device of FIG. 3, in a detached position, FIG. 18 in a schematic sectional view, the absorption part and the reducing part of the energy absorption device of FIG. 3 in the initial position, FIG. 19 in a perspective view, a sleeve element and an energy absorption device of a steering column assembly according to the invention according to a further embodiment in an initial position, FIG. 20 in a perspective view, a fastening part of the energy absorption device of FIG. 19, FIG. 21 in a schematic sectional view, the holder and a guide of the energy absorption device of FIG. 19 according to one embodiment, FIG. 22 in a schematic sectional view, a holder and a guide of the energy absorption device of FIG. 19 according to a further embodiment, and FIG. 23 in a schematic sectional view, a holder and a guide of the energy absorption device of FIG. 19 according to a further embodiment.

FIG. 1 shows a steering column assembly 10 for a vehicle, for example a motor vehicle such as a passenger car.

Figure 2:
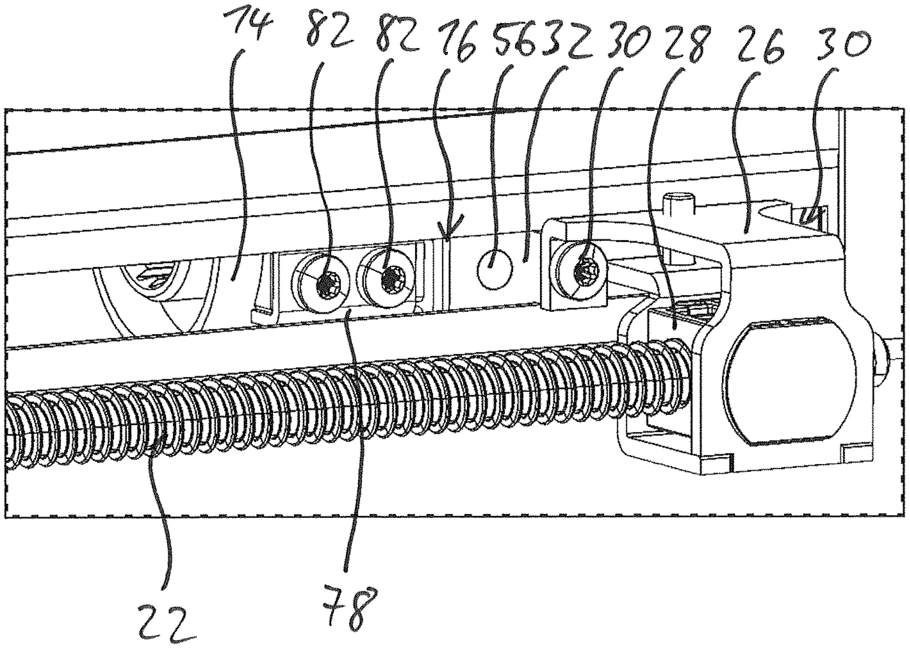

The steering column assembly 10 has a bearing element 12 fixed to the vehicle, a sleeve element 14, an energy absorption device 16 (see FIG. 2) and an electric steering column adjustment 18.

The bearing element 12 is fixedly connected to the chassis of the vehicle via a support, not shown, and is thus installed in a stationary manner in the vehicle.

The sleeve element 14 is accommodated within the bearing element 12 fixed to the vehicle and forms a receptacle for a steering spindle 20 which is mounted in the sleeve element 14 so as to be rotatable about the axis A and is axially adjustable together with the latter for steering wheel adjustment.

Figure 3:
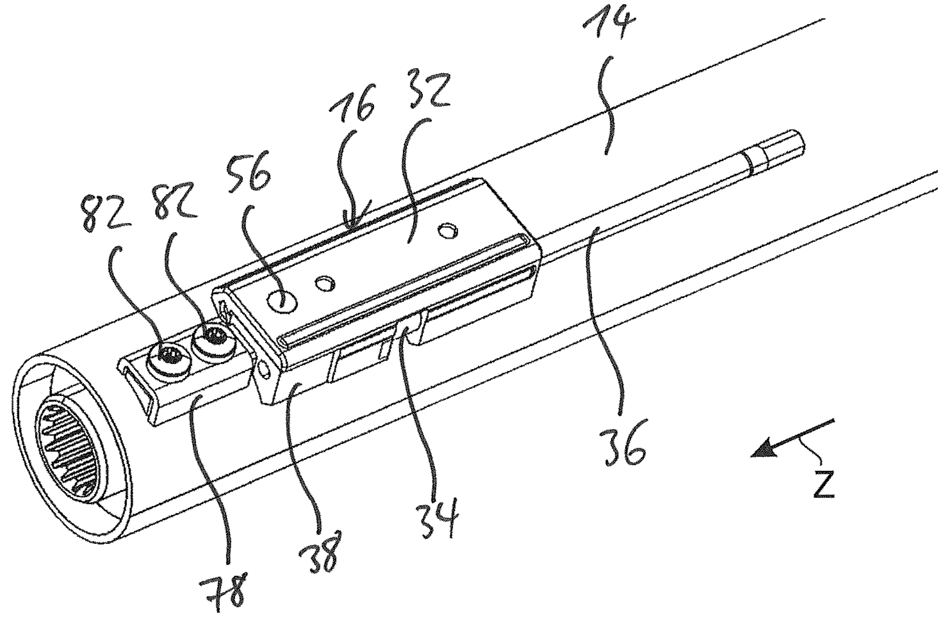

The energy absorption device 16 is arranged radially on the outside of the sleeve element 14 and is fixedly connected thereto (see FIG. 3).

The steering column adjustment 18 has a drive spindle 22 (see FIG. 1) which is rotatably fastened to the bearing element 12 and is coupled in a torque-transmitting manner to a drive motor 24, as well as an adjustment part 26 (see FIG. 2) having a spindle nut 28 through which the drive spindle 22 extends, so that these are coupled to one another in a driving manner.

The adjustment part 26 is rigidly fastened to a holder 32 of the energy absorption device 16 by means of two fastening screws 30 and is thus permanently connected to the energy absorption device 16, i.e. as long as the screw connection exists.

Of course, in alternative embodiments, instead of the two fastening screws 30, any desired number of arbitrarily formed fastening means can be provided for the permanent and thus play-free fastening of the adjustment part 26 to the holder 32.

By means of the steering column adjustment 18, the sleeve element 14 can thus be displaced relative to the bearing element 12 in and counter to the axial direction Z via the energy absorption device 16 in order to adjust the sleeve element 14 together with the steering spindle 20 and a steering wheel which is coupled to the steering spindle 20.

The axial direction Z corresponds to the longitudinal direction of the sleeve element 14.

The construction and operation of the energy absorption device 16 will be described below with reference to FIGS. 3 to 18.

In addition to the holder 32, the energy absorption device 16 has a reducing part 34, an absorption part 36 and a holding part 38.

The reducing part 34 has a passage 40 (see FIG. 8) in the form of a through hole.

In the embodiment shown, the reducing part 34 is sleeve-shaped and can thus be produced particularly material-and cost-efficiently.

The absorption part 36 (see FIG. 16) projects through the passage 40 in the reducing part 34 and is fastened to the holding part 38.

For this purpose, the absorption part 36 has a holding end 42 with an external thread 44 and the holding part 38 has an internal thread 46, via which the two components 36, 38 are screwed together.

In order to simplify the assembly, the absorption part 36 can have an assembly geometry on which a tool can act, for example a hexagon for a wrench.

The mounting geometry is formed, for example, at one end of the absorption part 36 which is arranged axially opposite to the holder end 42.

In principle, the absorption part 36 can be fastened to the holding part in any desired manner, in particular in a force-fitting or material-fitting manner.

Figure 10:
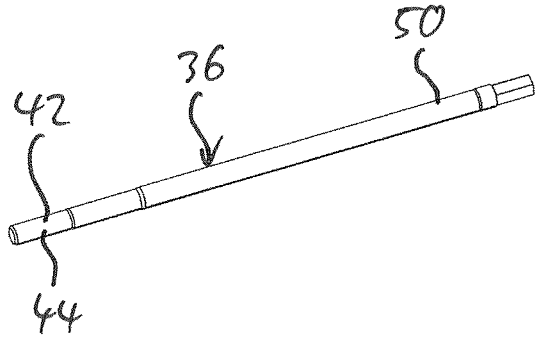
Figure 11:
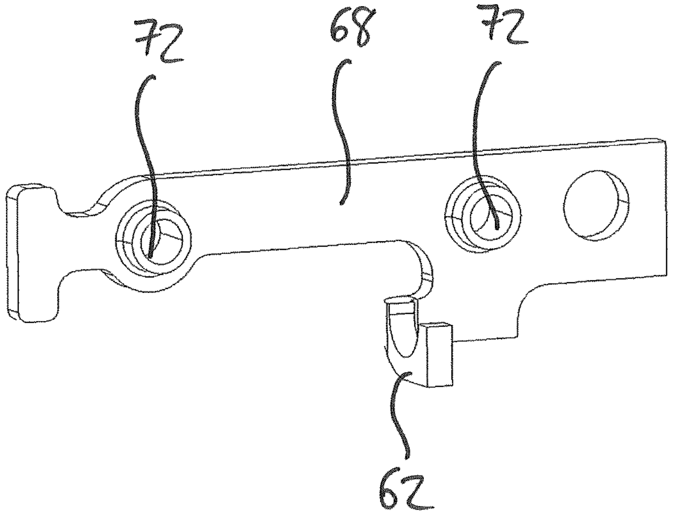
Figure 12:
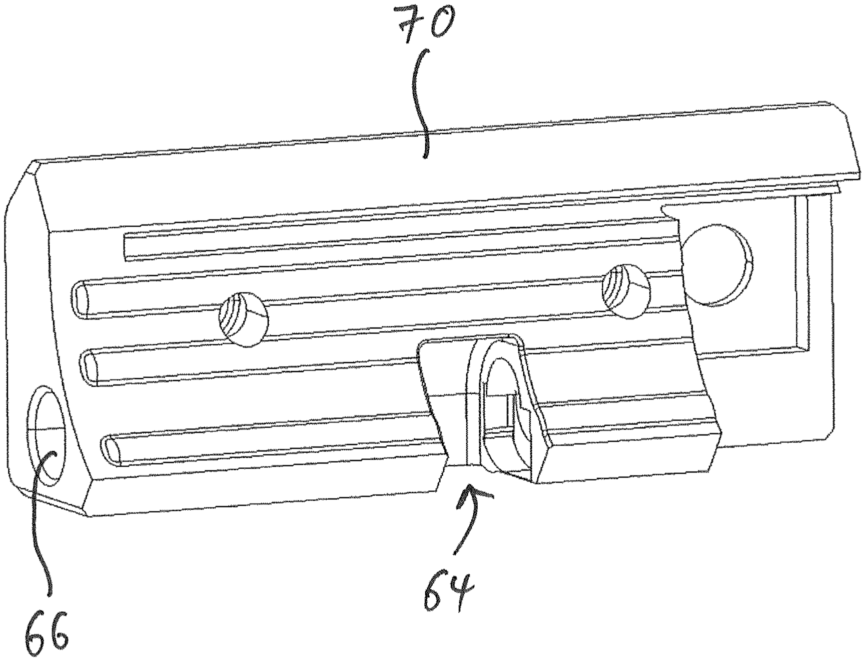
Figure 13:
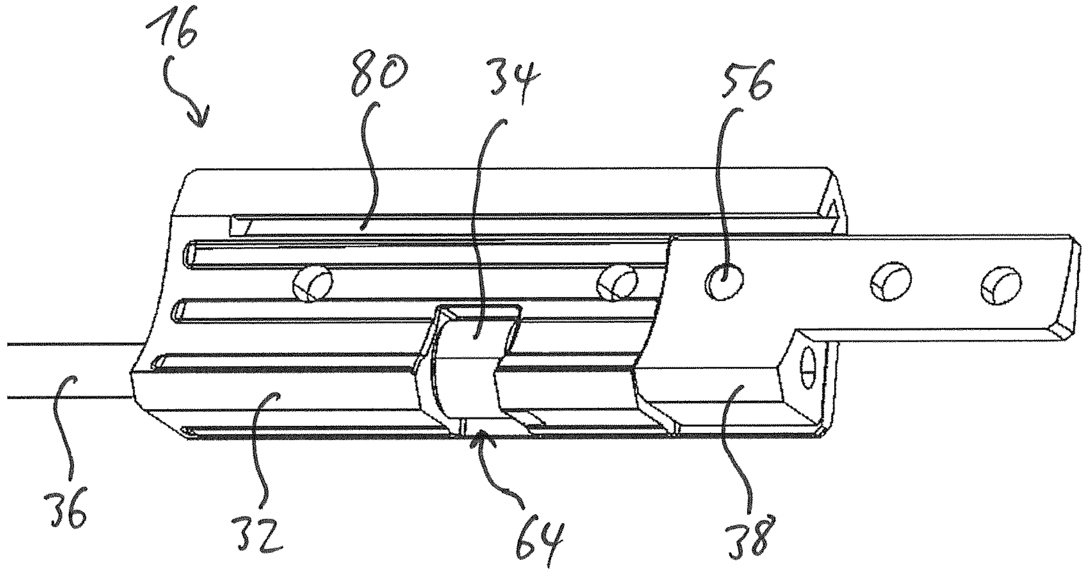
Figure 14:
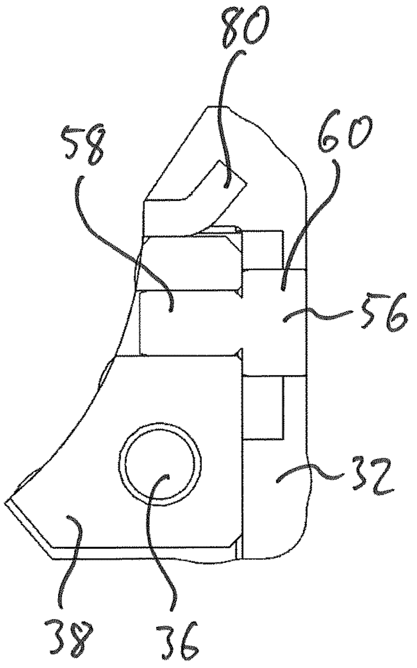
Figure 15:
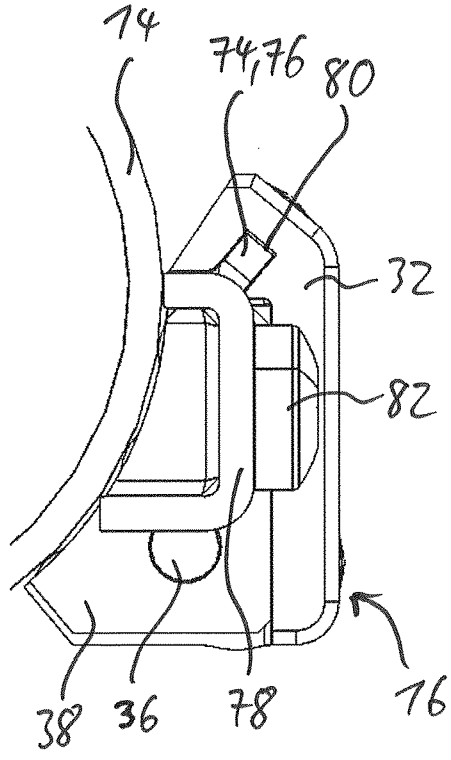
Figure 16:
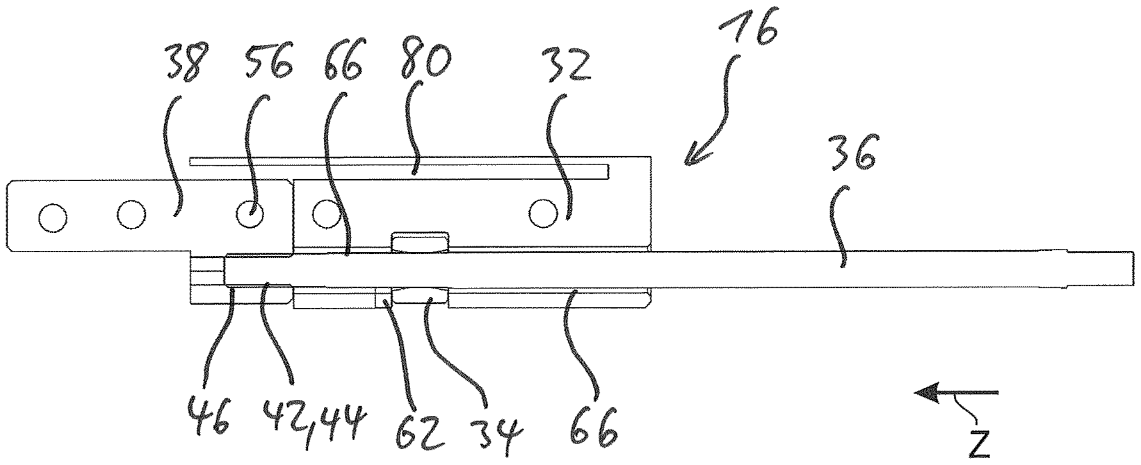
Figure 17:
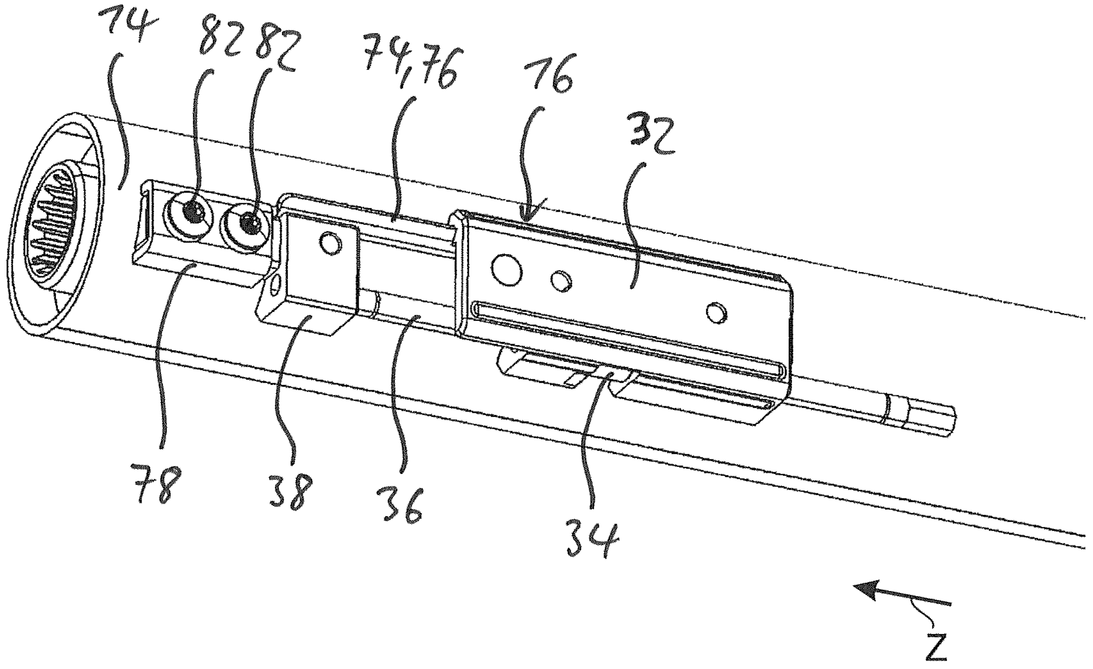

In the present embodiment, the absorption part 36 is a purely linear, rod-shaped, tubular or wire-shaped component (see FIG. 10).

In all embodiments, the absorption part 36 extends in the axial direction Z parallel to the sleeve element 14, more precisely to the axis A.

Figure 18:
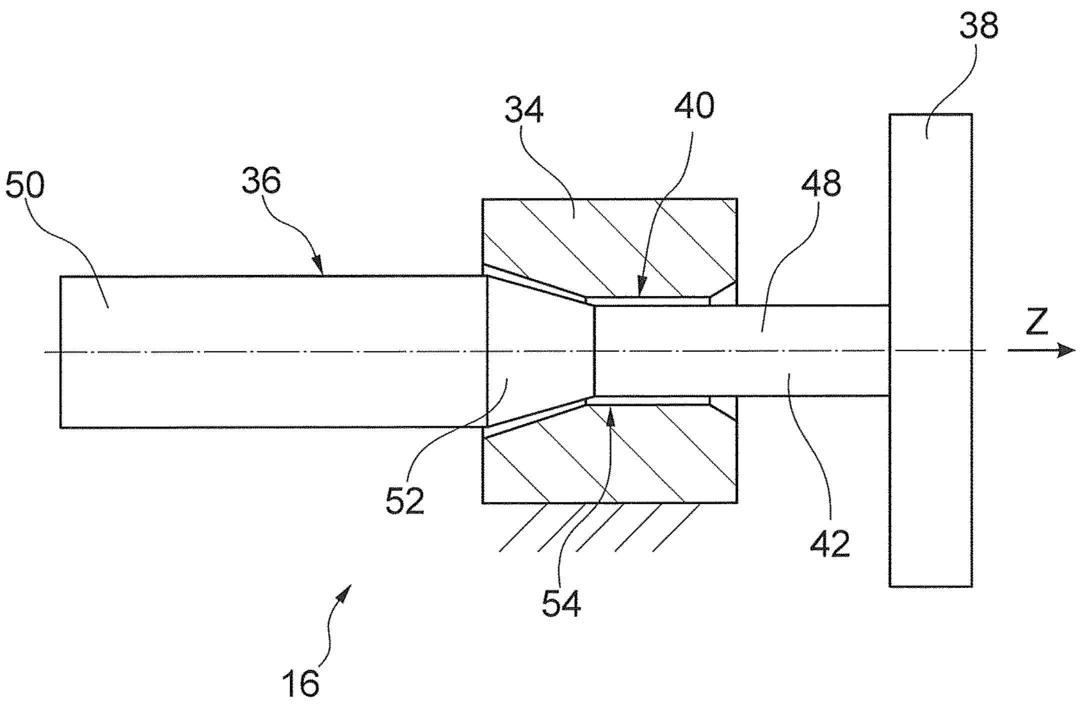

In FIG. 18, the concept of the energy absorption device 16 is shown in principle. The non-actuated initial position is shown before a vehicle crash in which the absorption part 36 is in its initial state, i.e. has not yet been deformed.

The absorption part 36 has a passive section 48 of smaller cross-section, which begins at the holding end 42 on the holding part 38 and extends into the passage 40, an end section 50 of larger cross-section ending at the opposite end and a transition section 52 connecting the sections 48 and 50, for example a conically tapering transition section.

The end section 50 can be exclusively cylindrical in the axial direction Z. In other words, the end section 50 consists exclusively of one or more cylindrical sections.

In an alternative embodiment, the end section 50 consists exclusively of one or more cylindrical sections and/or rotationally symmetrical sections, such as conical and frustoconical sections.

Starting from the end section 50, the passage 40 first narrows conically over a region, for example, in order then to reach a narrowest point 54 which defines the cross section of the passage 40.

The cross-section of the passive section 48 is smaller in cross-section than the passage 40 at the narrowest point 54.

In this connection, the absorption part 36 is fastened to the sleeve element 14 via the holding part 38, whereas the reducing part 34 is coupled to the bearing element 12 in a vehicle-fixed manner via the holder 32 and the steering column adjustment 18.

In the event of a vehicle crash, the sleeve element 14 according to FIG. 1 is moved in the direction Z by the impacting occupant, and with it the holding part 38. Thus, a tensile force is applied to the absorption part 36, and the end section 50, whose cross-section is larger than that of the passage 40 at the narrowest point 54, is drawn at least partially through the passage 40 and is thereby plastically deformed to a smaller diameter. This absorbs energy and thus provides damping.

At least in the region of the passage 40, the reducing part 34 preferably consists of a harder material than the absorption part 36. In addition, coatings may also be provided for one or both of these parts.

A tensile-compressive stress prevails in the forming zone itself. The forming mechanism underlying this concept corresponds to the wire drawing method.

In an alternative embodiment, the passive section 48 extends counter to the axial direction Z beyond the narrowest point 54, so that the transition section 52 is spaced from the narrowest point 54 and the deformation of the absorption part 36 begins only after an initial relative movement.

In principle, the absorption part 36 can be of any desired design as long as the above-described function is ensured.

For example, a plurality of sections with different diameters can be provided, in order to correspondingly change the required deformation force during the retraction of the steering column in the event of a vehicle crash.

For example, the end section 50 can have a section with a particularly large diameter in order to significantly increase the counterforce again towards the end of the crash process and thus effectively absorb the remaining kinetic energy.

In addition, a section can also be conical instead of cylindrical in order to permit an increasing or decreasing force curve.

In the embodiment shown, the energy absorption device 16 also has a predetermined breaking element 56 (see FIG. 14) which connects the holder 32 to the holding part 38 in a form-fitting manner and is initially destroyed in the event of a vehicle crash by the acting shear forces before the relative movement between the holder 32 and the holding part 38 deforms the absorption part 36.

Figure 6:
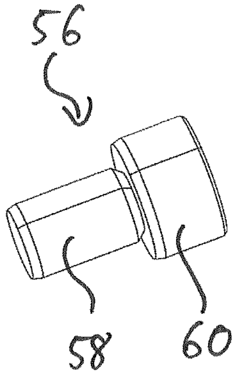
Figure 7:
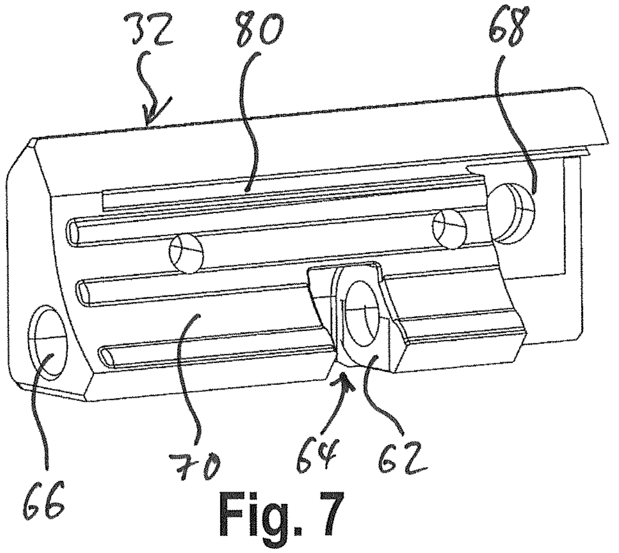
Figure 8:
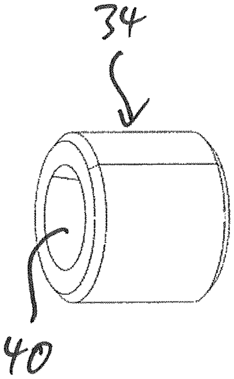
Figure 9:
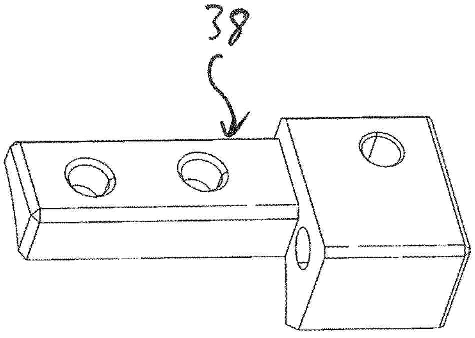

The predetermined breaking element 56 is here designed in the form of a shearing pin with two cylindrical axial sections 58, 60 with different diameters (see FIG. 6).

In principle, the predetermined breaking element 56 can be of any desired design and/or connect the holder 32 and the holding part 38 in any desired manner, as long as the predetermined breaking element 56 provides a defined resistance which must be overcome initially in the event of a vehicle crash.

The reducing part 34 is a separate component which rests on the holder 32 via an axial stop 62 (see FIG. 7) in the axial direction Z.

The holder 32 has a recess 64 in which the reducing part 34 is received and from which a through-hole 66 extends through the holder 32 in and against the axial direction Z, in which the absorption part 36 is guided within the holder 32.

The through hole 66 has, for example, an inner diameter which is greater than the largest outer diameter of the absorption part 36.

In this case, the reducing part 34 is threaded onto the absorption part 36, which extends through the through hole 66 and the recess 64, within the recess 64 and is thus mounted on the holder 32.

In this connection, the holder 32 has a core 68 (see FIG. 11), which is formed from metal for reinforcing the holder 32, and a jacket 70 (see FIG. 12), which consists of plastic.

The core 68 has a section which forms the stop 62.

Furthermore, two threads 72 are formed in the core 68, into which the fastening screws 30 (see FIG. 2) engage, in order to ensure a stable connection between the steering column adjustment 18 and the holder 32.

The holder 32 can be produced inexpensively by injection molding plastic around the core 68 in order to form the jacket 70.

In the embodiment shown, the jacket 70 encloses the core 68 only in sections, so that connecting sections such as the stop 62 and the threads 72 are exposed.

Alternatively, the core 68 can be completely surrounded by the jacket 70.

In an alternative embodiment, the holder 32 has a base body made of plastic on which one or more inserts made of metal are attached for reinforcement.

The inserts may form the stop 62 and/or comprise the threads 72.

In an alternative embodiment, the holder 32 is formed from a steel alloy, an aluminum alloy or a die-cast zinc alloy (Zamak) in one piece, for example . . . .

In order to ensure a defined relative movement between the holder 32 and the holding part 38 or the absorption part 36 and thus a defined damping in the event of a vehicle crash, the energy absorption device 16 furthermore has a linear guide 74 (see FIG. 17) on which the holder 32 is mounted displaceably in the axial direction Z with respect to the sleeve element 14.

In an alternative embodiment, the energy absorption device 16 has no linear guide 74 or no linear guide 74 with guide elements 76 specifically provided for this function. In this case, the other components of the energy absorption device 16 or of the steering column assembly 10 can assume the function of the linear guide 74, for example the holder 32 and the absorption part 36.

In the present embodiment, the linear guide 74 is formed by a guide element 76 in the form of a guide rail which is an integral part of a fastening part 78 (see FIG. 5) of the energy absorption device 16.

In principle, the linear guide 74 can have any number of guide elements 76, each of which is of any desired design.

For example, in an alternative embodiment, the linear guide 74 can be formed by one or more guide pins which are arranged one behind the other in the axial direction Z.

The fastening part 78 is, for example, a formed stamped part made of sheet metal.

In an alternative embodiment, the linear guide 74 is part of the sleeve element 14 and is formed, for example, by an axial web on the outside of the sleeve element 14.

In the present embodiment, the holder 32 has an axial guide groove 80 (see FIGS. 13 to 15) which is designed to be complementary to the guide rail and into which the guide rail engages.

Figure 4:
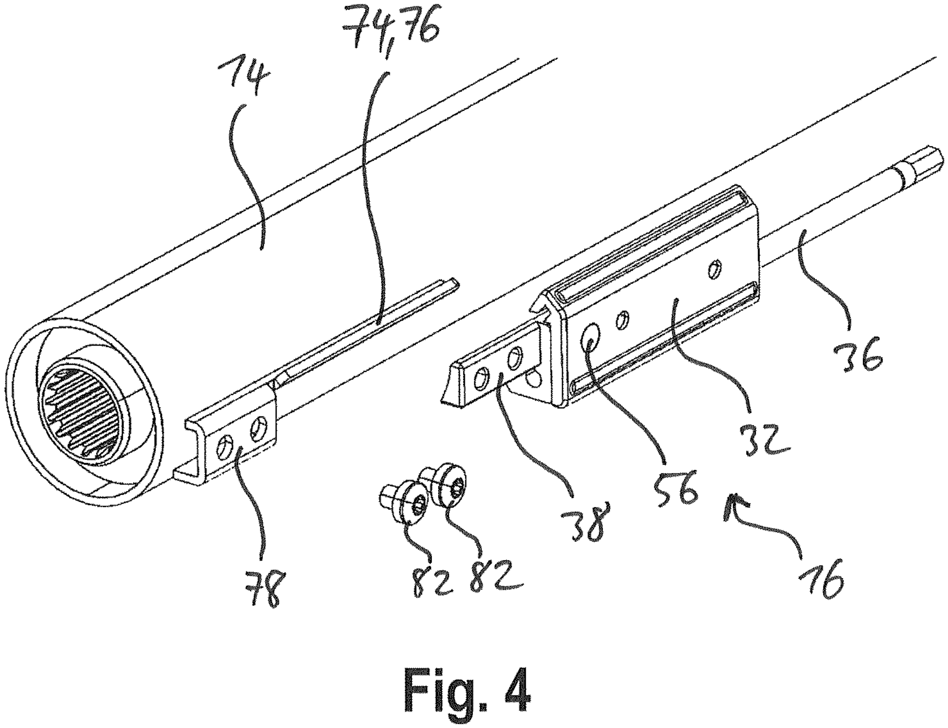
Figure 5:
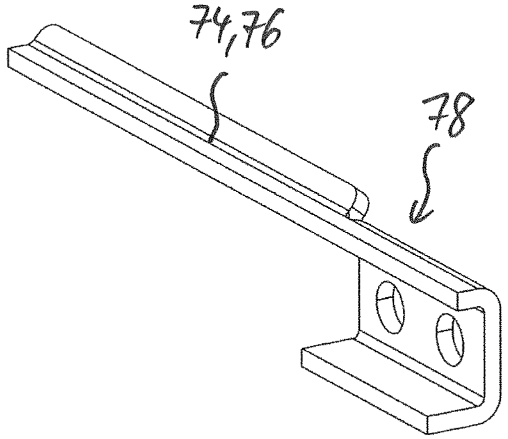

The fastening part 78, together with the holding part 38, is rigidly fastened to the sleeve element 14 via two screws 82 (see FIG. 4).

As a result, the linear guide 74, together with the axial guide groove 80, forms an anti-rotation device in the circumferential direction of the sleeve element 14 between the sleeve element 14 and the holder 32.

Of course, in alternative embodiments, instead of the two fastening screws 82, any desired number of arbitrarily formed fastening means can be provided for the fastening of the fastening part 78 and the holding part 38 to the sleeve element 14.

The energy absorption device 16 is designed in such a way that it can be fastened as a preassembled module unit in one piece to the sleeve element 14 by means of the screws 82 when the steering column assembly 10 is mounted.

The fastening part 78 can be part of the preassembled module unit.

In embodiments in which the linear guide 74 is part of the sleeve element 14, the fastening part 78 can be omitted.

Figure 19:
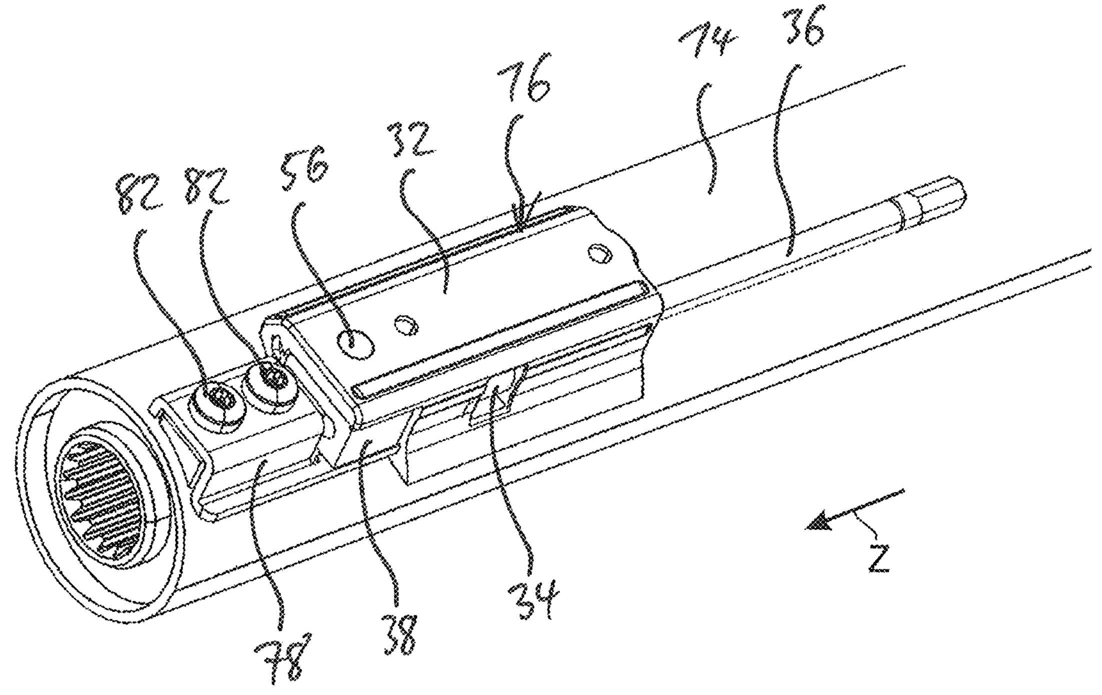
Figure 20:
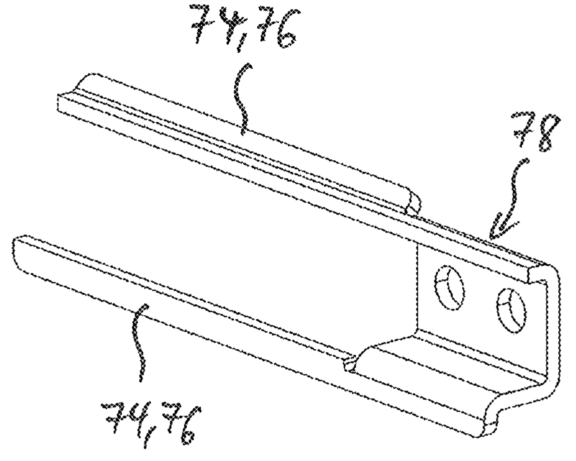
Figure 21:
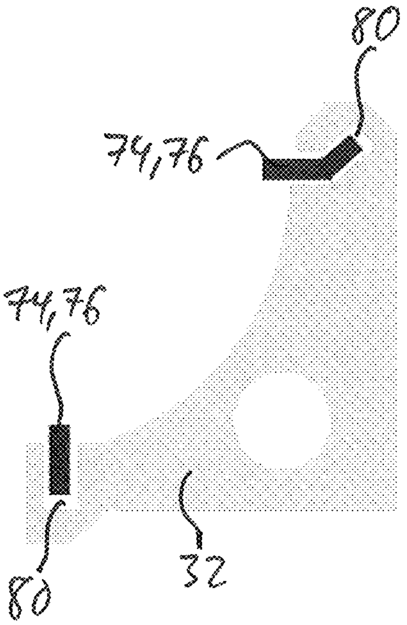

A steering column assembly 10 according to a further embodiment will now be described with reference to FIGS. 19 to 21. The same reference numerals are used for the components which are known from the above embodiment, and reference is made to the preceding explanations in this respect.

In contrast to the steering column assembly 10 described in connection with FIGS. 1 to 18, the energy absorption device 16 shown in FIG. 19 has a linear guide 74 which has two guide elements 76 in each case in the form of a guide rail.

Correspondingly, the holder 32 has two complementary guide grooves 80 in which the guide elements 76 engage.

Figure 22:
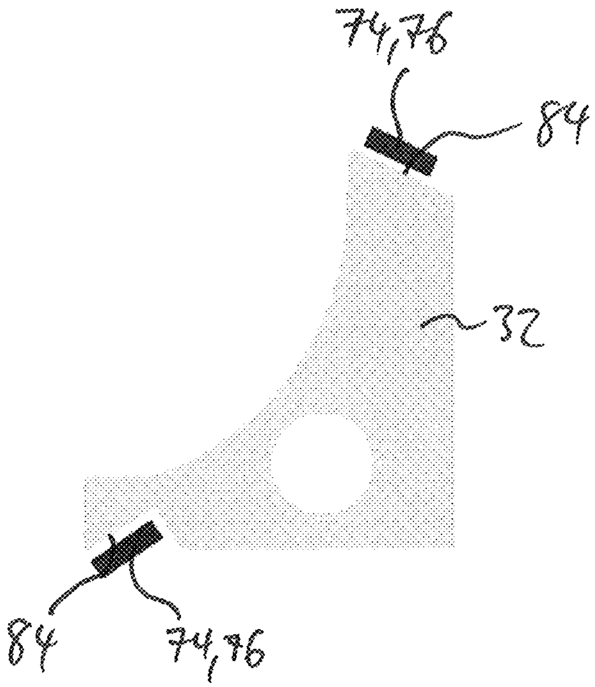

In addition to or alternatively to the guide grooves 80, the holder 32 can, in a further embodiment (see FIG. 22), have guide surfaces 84 against which the guide elements 76 bear, for example in a flat manner, and are guided in the axial direction Z when the holder 32 is displaced relative to the sleeve element 14.

In one embodiment, the guide surfaces 84 and the guide elements 76 are designed in such a way that they ensure that the holder 32 and the sleeve element 14 are secured against rotation.

Figure 23:
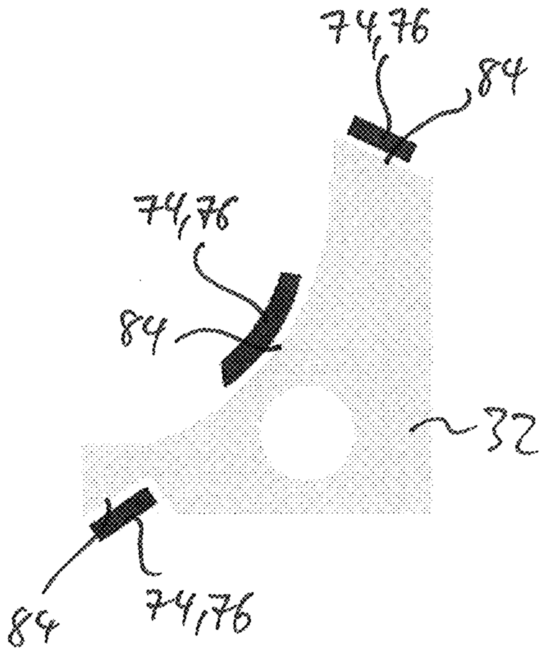

In a further alternative embodiment (see FIG. 23), the linear guide 74 has three guide elements 76 which rest on the holder 32 via correspondingly designed guide surfaces 84.

In this way, a steering column assembly 10 can be designed to be particularly compact.

Furthermore, the steering column assembly 10 can be produced inexpensively and has a small number of individual parts.

Furthermore, the energy absorption device 16 is of modular design and can therefore be adapted to different requirements with little effort and can be provided with defined energy absorption curves, for example by installing differently designed reducing parts 34, absorption parts 36 and/or predetermined breaking elements 56.

The invention claimed is:

1. A steering column assembly (10) for a vehicle, with a bearing element (12) fixed to the vehicle and a sleeve element (14) mounted thereon, through which a steering spindle (20) extends, an electric steering column adjustment (18) with an adjustment part (26) by which the sleeve element (14) can be adjusted in an axial direction (Z) relative to the bearing element (12), an energy absorption device (16) coupled to the bearing element (12) and to the sleeve element (14) and having an elongate absorption part (36) and a reducing part (34) having a passage (40) for the absorption part (36) through which the absorption part (36) extends and which has a smaller cross-section than an end section (50) of the absorption part (36), wherein the bearing and sleeve elements (12, 14) are coupled so as to be longitudinally displaceable relative to one another in an event of a vehicle crash in such a way that a relative longitudinal movement between the absorption part (36) and the reducing part (34) can take place, wherein the end section (50) is plastically deformed in cross-section through the passage (40) of smaller cross-section as a result of the longitudinal movement and a tensile force applied to the absorption part (36), wherein the absorption part (36) is fixedly coupled to the sleeve element (14), wherein the energy absorption device (16) has a holder (32) for the reducing part (34) which fixedly couples the reducing part (34) with the bearing element (12), wherein the adjustment part (26) is permanently rigidly fastened to the holder (32).

2. The steering column assembly (10) according to claim 1, wherein the reducing part (34) is a separate part mounted on the holder (32).

3. The steering column assembly (10) according to claim 1, wherein a linear guide (74) is provided, on which the holder (32) is mounted so as to be axially displaceable relative to the sleeve element (14) in a longitudinal direction of the sleeve element (14).

4. The steering column assembly (10) according to claim 3, wherein the linear guide (74) forms an anti-rotation device between the holder (32) and the sleeve element (14) in a circumferential direction of the sleeve element (14).

5. The steering column assembly (10) according to claim 3, wherein the linear guide (74) bears against a guide surface (84) of the holder (32) and/or engages in a guide groove (80) of the holder (32).

6. The steering column assembly (10) according to claim 5, wherein the linear guide (74) has at least one guide rail.

7. The steering column assembly (10) according to claim 5, wherein the linear guide (74) is integrally formed with the sleeve part (14) or a fastening part (78) which mounts the absorption part (36) on the sleeve element (14).

8. The steering column assembly (10) according to claim 1, wherein the holder (32) has a core (68) of metal and a jacket (70) of plastic surrounding the core (68) at least in sections, or that the holder (32) has a base body of plastic and at least one insert of metal, which is attached to the base body.

9. The steering column assembly (10) according to claim 1, wherein the energy absorption device (16) has a predetermined breaking element (56) which, in the event of the vehicle crash, is destroyed at a beginning of the relative longitudinal movement between the absorption part (36) and the reducing part (34).

10. The steering column assembly (10) according to claim 1, wherein the energy absorption device (16) has a holding part (38) on which the absorption part (36) is fastened, the absorption part (36) having an external thread (44) and the holding part (38) having an internal thread (46) so that the absorption part (36) and the holding part (38) are screwed together.

11. The steering column assembly (10) according to claim 1, wherein the energy absorption device (16) is designed as a preassembled module unit, which can be fastened on the sleeve element (14) by at least one screw (82).

12. The steering column assembly (10) according to claim 1, wherein at least the end section (50) of the absorption part (36) is designed exclusively cylindrically.

13. The steering column assembly (10) according to claim 1, wherein in an initial state, before the vehicle crash, the absorption part (36) has a cross section from a holding end (42) opposite the end section (50) to at least the passage (40), which cross section permits movement through the passage (40) without any plastic deformation of the absorption part (36).

14. The steering column assembly (10) according to claim 1, wherein the adjustment part (26) comprises a spindle nut (28), through which a motor-driven drive spindle (22) extends for driving the sleeve element (14).

15. The steering column assembly (10) according to claim 1, wherein the energy absorption device (16) is arranged on an outside of the sleeve element (14).

16. The steering column assembly (10) according to claim 1, wherein the holder (32) is prevented from moving relative to the reducing part (34), the adjustment part (26) and the bearing element (12).

17. The steering column assembly (10) according to claim 1, wherein the sleeve element (14) moves relative to the bearing element (12), the holder (32) and the adjustment part (26) during adjustment of the sleeve element (14) in the axial direction (Z) relative to the bearing element (12).

18. The steering column assembly (10) according to claim 1, wherein the holder (32) prevents relative movement between the adjustment part (26) and the reducing part (34) at all times.

* * * * *